(12) United States Patent
Miyamoto et al.

(10) Patent No.: US 8,132,188 B2
(45) Date of Patent: Mar. 6, 2012

(54) METHOD AND SYSTEM FOR EXTENSION REGISTRY FILTERING

(75) Inventors: Hiroyuki Miyamoto, Lexington, MA (US); Sami M. Shalabi, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 1548 days.

(21) Appl. No.: 11/379,624

(22) Filed: Apr. 21, 2006

(65) Prior Publication Data

US 2007/0261066 A1 Nov. 8, 2007

(51) Int. Cl.
*G06F 9/44* (2006.01)
*G06F 21/00* (2006.01)

(52) U.S. Cl. .......................................... 719/328; 705/59
(58) Field of Classification Search .................... 705/59; 717/178; 719/332, 328
See application file for complete search history.

(56) References Cited

U.S. PATENT DOCUMENTS

| | | | |
|---|---|---|---|
| 7,392,522 B2* | 6/2008 | Murray et al. ................ | 717/174 |
| 7,406,695 B2* | 7/2008 | Dattke et al. .................. | 719/315 |
| 7,665,086 B2* | 2/2010 | Cope et al. .................... | 717/174 |
| 2002/0129277 A1 | 9/2002 | Caccavale | |
| 2003/0144869 A1* | 7/2003 | Fung et al. ........................ | 705/1 |
| 2004/0143835 A1 | 7/2004 | Dattke et al. | |
| 2007/0239985 A1* | 10/2007 | Bernabeu-Auban et al. . | 713/168 |

OTHER PUBLICATIONS

IBM Corporation, The Eclipse Rich Client Platform, 40 pages of Slides by Various Members of the Eclipse JDT and Platform Teams.

* cited by examiner

*Primary Examiner* — Charles E Anya
(74) *Attorney, Agent, or Firm* — David A. Dagg (57) ABSTRACT

A set of attached extensions is reduced before it is exposed to the code of a processing extension point to which the extensions are attached. An application calls an extension registry to obtain a list of available extensions attached to a given extension point, and filter functionality is integrated into the extension registry. Filters including filtering logic are plugged into the extension registry itself, and the extension registry selects the filter or filters to be applied for a current context. The extension registry defines an extension point to collect filters as extensions and to define an interface that those filters will implement. Each filter specifies when it should be called. As a result, an application can supply a filter that knows what extensions to expose and which to exclude in one or more contexts.

12 Claims, 5 Drawing Sheets

METHOD AND SYSTEM FOR EXTENSION REGISTRY FILTERING

FIELD OF THE INVENTION

The present invention relates generally to an extensible application program platform that defines mechanisms for extending the functionality of a computer software application program at run time, and more specifically to a method and system for providing filter functionality in an extension registry.

BACKGROUND OF THE INVENTION

As it is generally known, in the area of software application program design, an application platform is a collection of application program interfaces and/or protocols on which applications can be developed. It is desirable for an application program platform to be extensible, so that the functionality of application programs using the platform can be dynamically extended at run time. Extensibility in this area has many potential advantages, including reduced cost of implementing new functions, reduced overall complexity, reduced overall code size, increased number of use cases supported, reduced development and testing costs, reduced installation costs, increased modularity, convenient delivery of new features, better reuse of components, and others.

The Eclipse Foundation (www.eclipse.org) has developed a simple yet powerful and flexible extensibility framework around its plug-in component model. In the Eclipse model, a plug-in can define one or more extension points and/or one or more extensions. An extension point can, in theory, have an unlimited number of extensions attached. An extension point can potentially call and request a service from all or some of the extensions that are attached to it. However, a shortcoming of the Eclipse model is apparent in the case where an application defines an extension point and needs to process extensions attached to the extension point selectively. For example, an application generating a "tabbed" user interface, presenting multiple folder tab display objects in the user interface, may need to show only certain appropriate tabs within a current execution context, based on context attributes such as the specific user, software license, configuration or setup values, current state, etc. In such a situation, using previous systems, the extension point sees all attached extensions representing tabs for display, but must be selective in processing them. As a result, the extension point program code must process if-then-else statements or the like with regard to current context variables before deciding which extensions to call and render, causing the main code (i.e. loop) of the extension point to become complex and difficult to manage.

For these reasons and others, it would be desirable to have a new extensible application program platform that defines mechanisms for extending the functionality of a computer software application program at run time, that improves the ability of Eclipse type extension points to efficiently handle large numbers of attached extensions.

SUMMARY OF THE INVENTION

To address the above described and other shortcomings of previous approaches, an improved extensible application program platform is disclosed. The disclosed system defines efficient mechanisms for extending the functionality of a computer software application program at run time, and may be specifically embodied to improve the ability of Eclipse type extension points to efficiently handle large numbers of attached extensions.

In the disclosed system, the visible set of attached extensions is reduced before it is exposed to the code of the processing extension point to which the extensions are attached. Because the set of extensions that are visible to the extension point code is appropriately narrowed based on current context variables, the main processing code of the extension point can just call each of the reduced set of visible extensions without performing context testing to determine whether each extension should be called. The main looping code for the extension point is potentially much cleaner and easier to maintain as a result. Another potential advantage of the disclosed system is that it makes it possible to independently replace the filter logic after the initial code development, as may be necessary or desirable.

During operation of the disclosed system, an application calls an extension registry to obtain a list of available extensions attached to a given extension point. In order to automatically narrow the set of extensions presented to the extension point, before the calling application can obtain the entire list of all extensions attached to the extension point, the disclosed system includes filter functionality that is integrated into the extension registry. In order to inform the extension registry which extensions to filter out, filters including filtering logic are plugged into the extension registry itself, and the registry selects the filter or filters to be applied for a current context.

The extension registry itself defines an extension point to collect filters as extensions, and to define an interface that those filters will implement. Each filter specifies in some way the set of conditions that define when it should be called. An application can supply a filter that knows what extensions to expose and which to exclude in a number of contexts, and also provide a hint to the extension registry indicating when the extension registry should apply the filter. In one embodiment, each filter specifies a name of an extension registry instance, and the application provides that name when obtaining an extension registry instance in order to find the extensions for an extension point. Using this approach, the named instance of the extension registry searches for filters using its own name, as a result of the application requesting extensions for a given extension point. By utilizing the disclosed filtering capability in the extension registry, the application can essentially split the conditional code contained in a filter from the main loop of an extension point, resulting in much more maintainable code. Also, because filters are supplied as extensions to the system, they can be easily replaced or reused, which leads to lower cost of developing and managing applications.

Thus there is disclosed an extensible application program platform that defines mechanisms for extending the functionality of a computer software application program at run time, and that improves the ability of Eclipse type extension points to efficiently handle large numbers of attached extensions.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
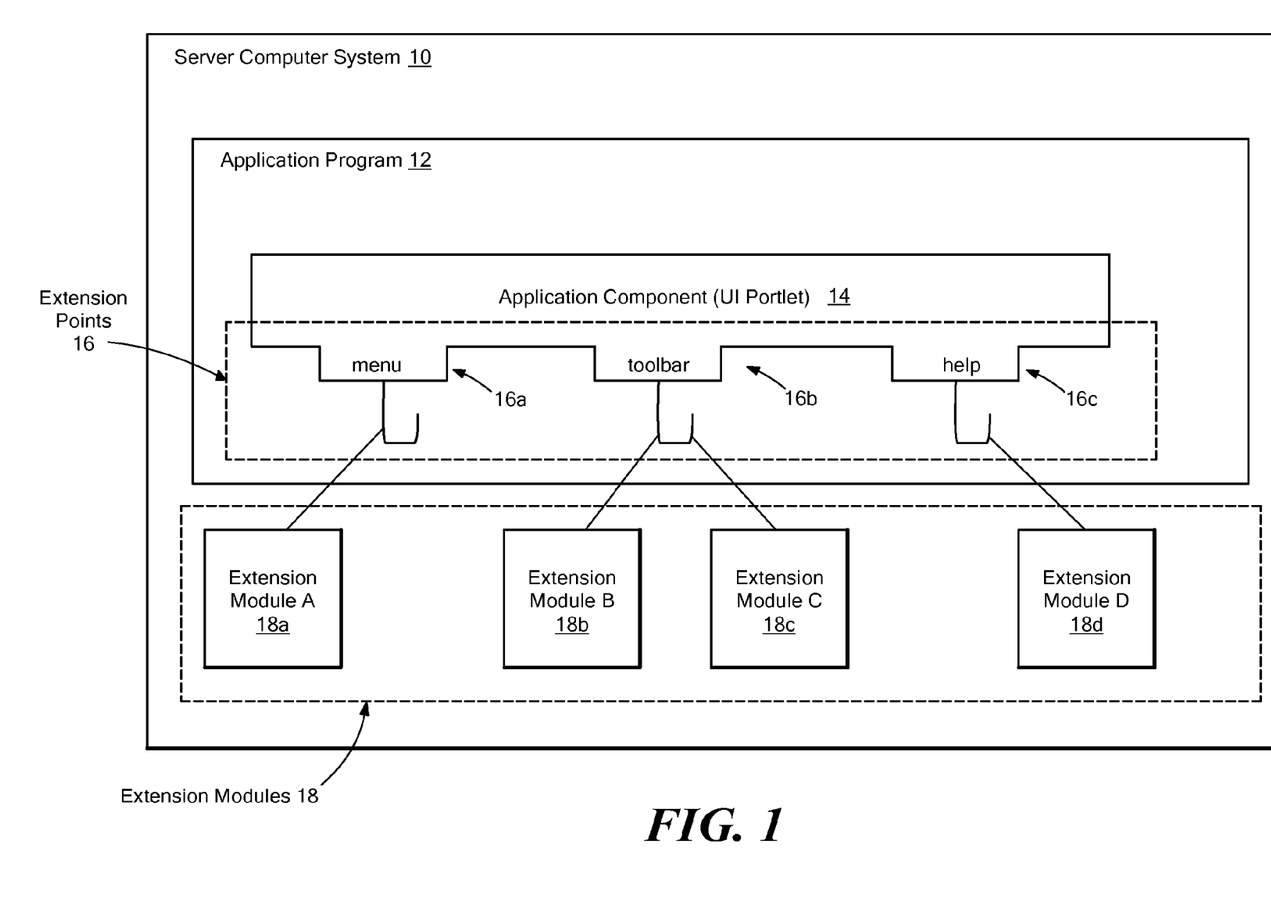
FIG. 1 is a block diagram showing software and hardware components in an execution environment of an illustrative embodiment.

As shown in FIG. 1, an execution environment including an illustrative embodiment of the disclosed system includes a server computer system 10, having an application program 12 executing thereon. The application program 12 includes an application component 14. For purposes of explanation, the application component 14 in the example of FIG. 1 is shown as a user interface portlet component, though the disclosed system is not so limited, and may be embodied to provide any specific kind of application component. The server computer system 10 of FIG. 1 may include at least one processor, program storage, such as memory, for storing program code executable on the processor, and one or more input/output devices and/or interfaces, such as data communication and/or peripheral device interfaces. The computer system 10 may further include appropriate operating system software.

In one embodiment, the disclosed system uses a plug-in component architecture, such as the Eclipse plug-in component model set forth by the Eclipse Foundation (www.eclipse.org). Using such an approach, the application component 14 is a plug-in component that defines one or more extension points 16 and one or more extension modules 18. Using the disclosed system, any one of the extension points 16 can effectively and efficiently process an unlimited number of attached extension modules, by requesting a service from only appropriate ones of the extension modules attached to it based on a current context. In Eclipse terminology, a "plug-in" is a software component that provides a certain type of service, an "extension point" is the place in a plug-in where other plug-ins may contribute functionality to a plug-in, a "host" is a plug-in that defines an extension point, an "extender" is a plug-in that defines an extension to an existing extension point. A plug-in, such as the application component 14, can be both a host and an extender at the same time, as defined in an XML (eXtensible Markup Language) file within the plug-in. The semantics associated with the extension points 16, including interfaces and schema, are driven by the application component 14 as a host.

The extension points 16 in the example of FIG. 1 include a menu 16a, a toolbar 16b, and a help function 16c. The extension modules 18 allow for external functionality to be conveniently added to application component 14. The menu extension point 16a is shown having an extension module A 18a attached thereto. The extension module 18a could be used to provide a menu item not originally included in a corresponding menu user interface construct of the application component 14. The toolbar extension point 16b is shown having extension modules B 18b and C 18c attached thereto. The extension modules 18b and 18c could be used to provide toolbar buttons not originally included in a corresponding toolbar user interface construct of the application component 14. The help extension point 16c is shown having an extension module D 18d attached thereto. The extension module D 18d could be used to provide help information not originally included in a corresponding help file or display user interface construct of the application component 14.

The example of FIG. 1 shows how extension points 16 can be used to extend the functionality of an application component by attaching extension modules. Adding new menu items, extending existing choices, and adding pre- or post-processing to an existing application can all be potentially accomplished using extension points.

Each of the extension points 16 may, for example, be defined by the following steps:
  determining what parts of the application component 14 to expose to the attached extension modules 18,
  assigning a unique identifier to the extension point,
  defining an interface for any attached extension modules to implement,
  adding run time looping code for the extension point needed to process appropriate attached extension modules for a given current context,
  adding corresponding XML as necessary to any system metadata, and
  optionally registering a corresponding listener object to detect changes in a registry of extension modules.

Each of the extension modules 18, may, for example, be defined by the following steps:
  identifying and learning about an extension point,
  generating XML code that conforms to any schema specified by the extension point,
  preparing a software module that implements any interface specified by the extension point, provides functionality to contribute through the interface, and
  adding corresponding XML as necessary to any system metadata.

Figure 2:
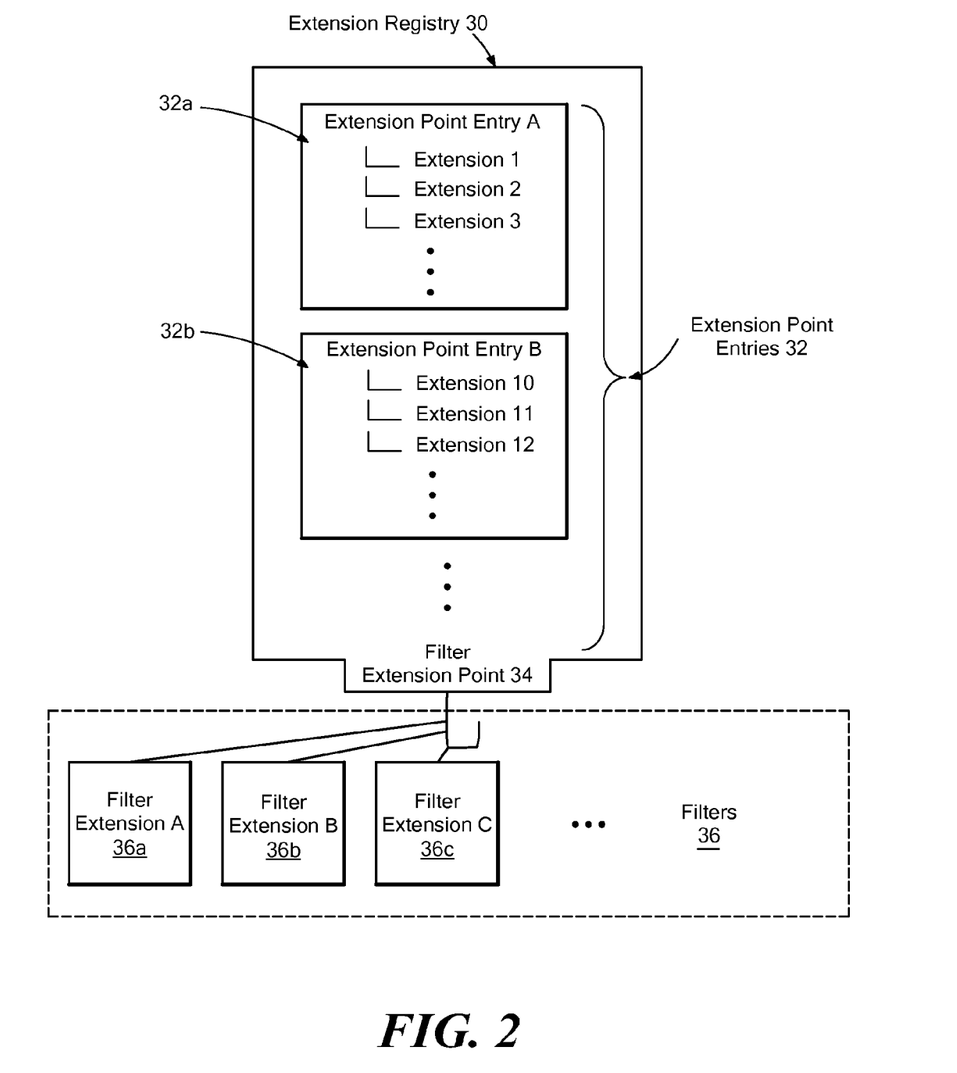
FIG. 2 is a block diagram showing software components in an illustrative embodiment.

FIG. 2 is a block diagram showing software components in an illustrative embodiment. As shown in FIG. 2, an extension registry 30 includes a number of extension point entries 32. Each of the extension point entries 32 indicates the extension modules for a corresponding extension point. For example, the extension point entry 32a indicates that extension module 1, extension module 2, and extension module 3 are attached to an extension point A, and extension point entry 32b indicates that extension module 10, extension module 11, and extension module 12 are attached to an extension point B. Also included in the Extension Registry 30 is a filter extension point 34, to which filter extension modules may be attached. In the example of FIG. 2, filter extension modules 36, including filter extension module A 36a, filter extension module B 36b, filter extension module C 36c, etc., are attached to the filter extension point 34. The extension registry 30 and filter extension modules 36 may, for example, be software components executing on the server computer system 10 of FIG. 1, either internal and/or external to the application program 12.

Figure 3:
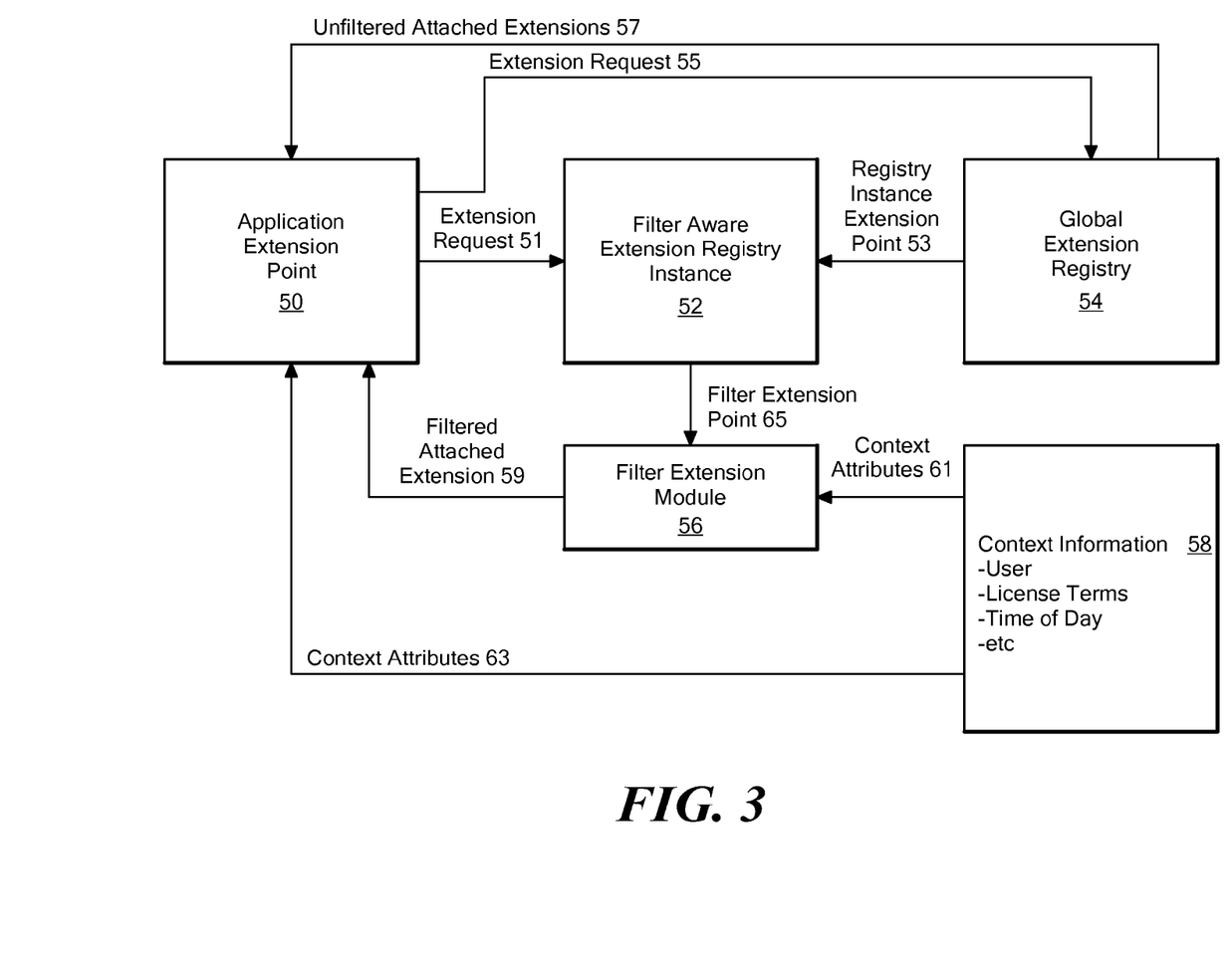
FIG. 3 is a block diagram further illustrating the structure and operation of software components in an illustrative embodiment.

FIG. 3 is a block diagram further illustrating software components in an illustrative embodiment. As shown in FIG. 3, an application extension point 50 sends a request 51 for attached extension modules to a filter aware extension registry instance 52. The filter aware extension registry instance 52 is associated with the global extension registry 54, by way of registry instance extension point 53 of the global extension registry 54. Accordingly, in order to use the filter aware extension registry instance 52, the application extension point 50 or the application program including application extension point 50 must first obtain the filter aware extension registry instance 52, for example based on the unique name of the filter aware extension registry instance 52. An application may operate completely based on the attachments indicated in the global extension registry 54, and in such a case need not obtain any filter aware extension registry instance. Otherwise, if extension filtering is desired, an application must obtain a filter aware extension registry instance, such as the filter aware extension registry instance 52 of FIG. 3.

The filter aware extension registry instance 52 calls a filter extension module 56 through a filter extension point 65 of the filter extension registry instance 52. The filter extension module operates in response to one or more context attributes 61 obtained from context information 58. The context information 58 may include a variety of context information, such as indication of a current user, software license terms indicating specific functionality that has been licensed to certain users, the current time of day, and other information. For example, the filter extension module 56 may operate to filter out certain extension modules providing functionality that is not licensed to a current user, or that is not permitted to be used by a current user, for example because it is administrator functionality. The filter extension module 56 operates to determine the filtered set of attached extension modules 59, which are communicated to the application extension point 50, and which are a subset of all extension modules attached to the application extension point 50.

Context attributes 63 are also passed from the context information 58 to the application extension point 50, which may select between making the extension request 51 to the filter aware extension registry instance 52 or to an instance of the global extension registry 54 that is not filter aware in response to context attributes 63. In response to the extension request 55, the non-filter aware instance of the global extension registry 54 would provide unfiltered attached extension modules 57 to the application extension point 50, including all extension modules that are attached to the application extension point 50.

Figure 4:
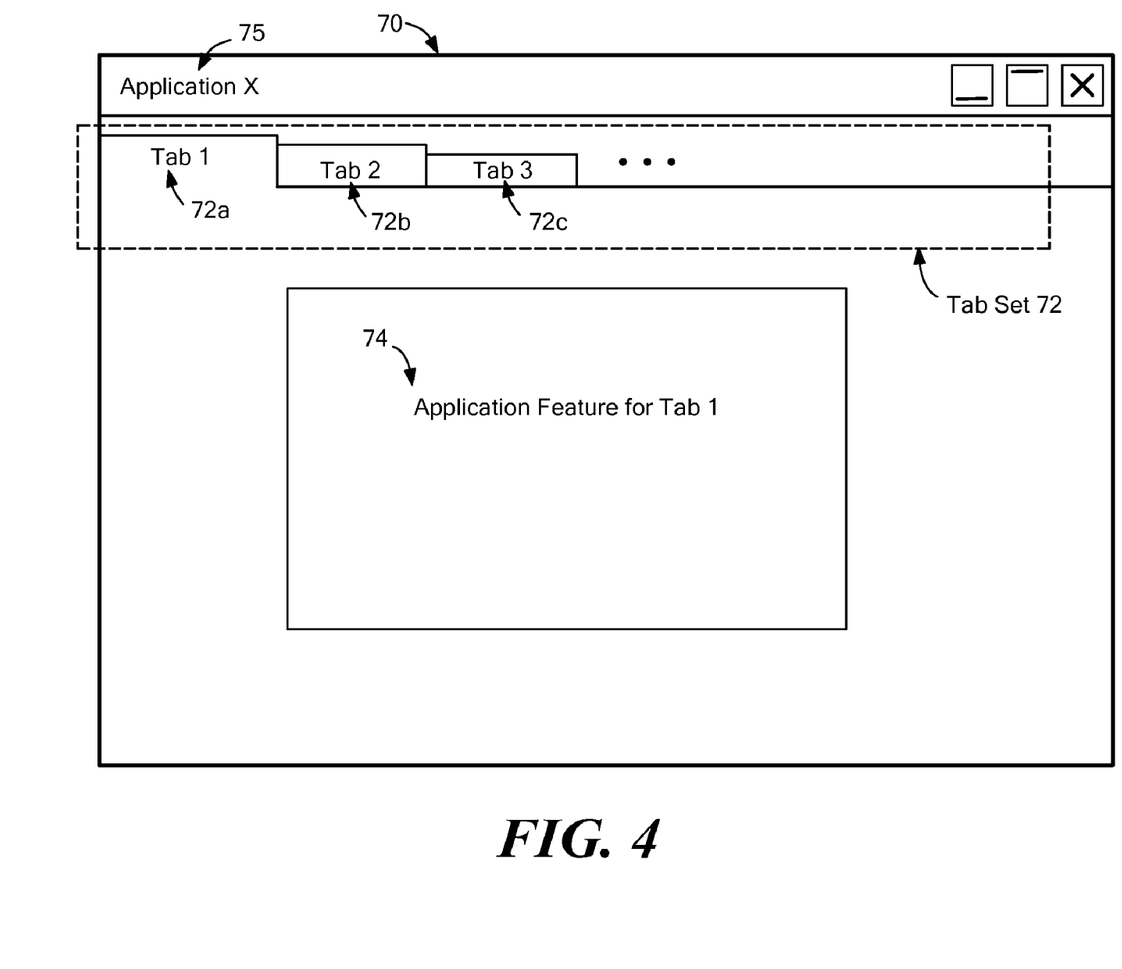
FIG. 4 is a simplified screen shot of a user interface illustrating one possible application of an embodiment of the disclosed system.

FIG. 4 is a simplified screen shot of a user interface 70 illustrating one possible application of an embodiment of the disclosed system. The user interface 70 may, for example, be provided by the application program 12 of FIG. 1. The user interface 70 is shown including a set of tab folder graphical objects ("tabs") 72, each of which represents and provides a corresponding application function of an underlying application program. For example, tab 1 72*a* and tab 2 72*b* might provide application functions that are available to all users of Application X, where the application feature 74 for tab 1 72*a* is currently selected. Tab 3 72*c* might provide an application function that is only to be provided to an administrative user having special privileges.

In an embodiment of the disclosed system where each of the tabs 72 is provided by an extension module attached to an extension point of Application X, then filter logic in a filter extension module attached to a filter aware extension registry instance would operate to determine the privileges of a current user. In the case where the current user had sufficient administrative privileges to have access to the function provided by tab 3 72*c*, the filter logic would include the extension module implementing the function for tab 3 72*c* in the filtered set of extension modules returned to the extension point of Application X. Otherwise, if the current user did not have sufficient privileges, then the filter logic of the filter extension module would not include the extension module implementing the function for tab 3 72*c* in the filtered set of extension modules returned to the extension point of Application X, and tab 3 72*c* would accordingly not be included by Application X in the user interface 70.

Figure 5:
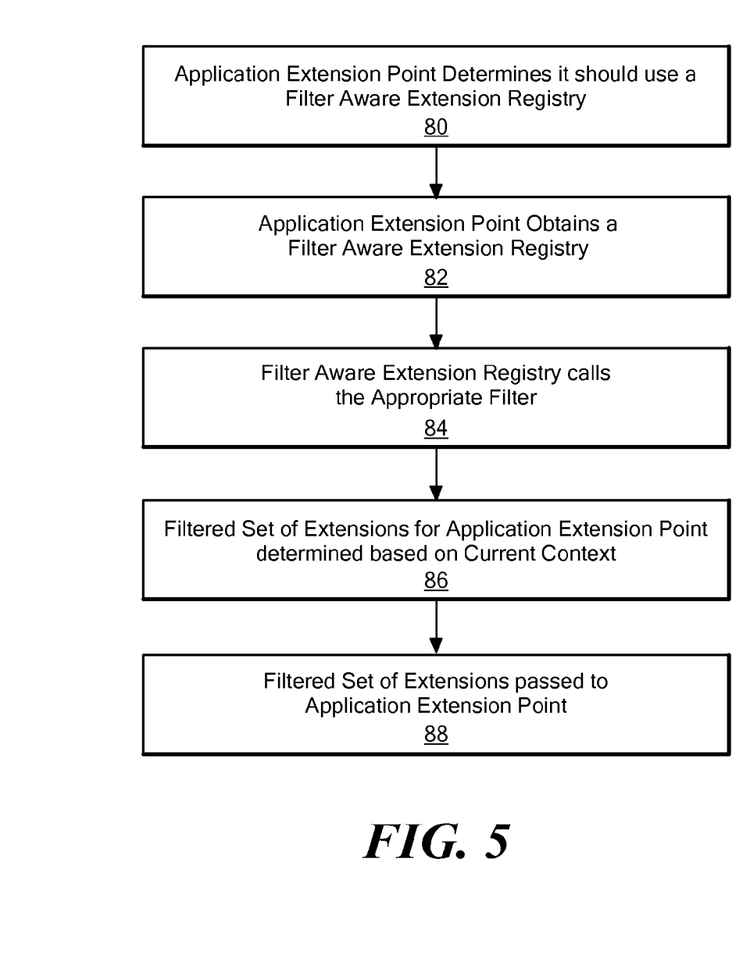
FIG. 5 is a flow chart showing steps performed in an illustrative embodiment.

FIG. 5 is a flow chart showing steps performed in an illustrative embodiment. The steps shown in FIG. 5 may, for example, be performed by software executing on the server computer system 10 of FIG. 1. At step 80 an application extension point determines that it should use a filter aware extension registry. The determination at step 80 may be predetermined or made in response to one or more current context attributes. At step 82, the application extension point obtains a filter aware extension registry from which it requests indication of all extension modules that are attached to the extension point. In response to the request, at step 84 the filter aware extension registry calls an appropriate filter extension module, which determines a filtered set of extension modules based on at least one attribute of the current context. The filtered set of extension modules are then passed to the application extension point at step 88.

Figure 6:
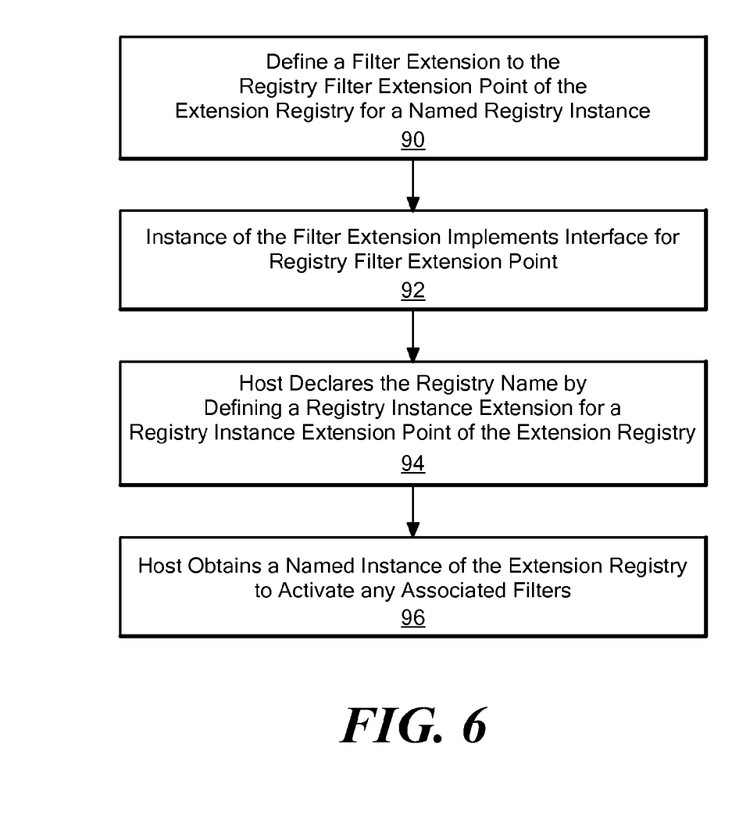
FIG. 6 is another flow chart showing steps performed in an illustrative embodiment.

FIG. 6 is another flow chart showing steps performed in an illustrative embodiment. In the embodiment of FIG. 6, the filter aware extension registry 52 of FIG. 3 exposes an extension point called "RegistryFilter." Filter extension modules can be written and applied to narrow the visible set of extension modules in the filter aware extension registry 52 when an application asks for the extensions that are attached to an extension point. Each filter extension module specifies whether it is to be applied by all filter aware registry instances, or only by particularly named instances. In the first case, the filter extension module is applied to all extension registry instances, and thus all applications use the filter extension module without explicitly asking for it. In the latter case, an application pre-defines a registry name by defining an extension module for an extension point "RegistryInstance" global extension registry 54 defines. Then, the application can obtain the named registry instance, and the name of the named registry instance will be used to collect filter extension modules to apply.

As shown in FIG. 6, at step 90 an application defines a filter extension module to the registry filter extension point ("RegistryFilter") of a named instance of the extension registry. Example program code for step 90 in one embodiment is as follows:

```
<extension point="org.eclipse.extensionregistry.RegistryFilter">
    <filter name="AdminConsole*"
        class="com.acme.admin.AdminConsoleExtensionFilter"/>
</extension>
```

At step 92, the filter extension module implements an interface ("IExtensionRegistryFilter") defined by the registry filter extension point. Example program code for step 92 is as follows:

```
package com.acme.admin;
public class AdminConsoleExtensionFilter implements
IExtensionRegistryFilter {
    :
}
```

At step 94 an application component defining the extension point (the "host") declares the registry name by defining an extension for the RegistryInstance extension point. In this way, the disclosed system enables the extension registry to prepare an IExtensionRegistry instance and put it in a JNDI (Java Naming and Directory Interface) in advance, assuming the embodiment is based on the J2EE (Java 2 Platform, Enterprise Edition) platform. Example program code for step 94 is as follows:

```
<extension point="org.eclipse.extensionregistry.RegistryInstance">
    <registry name="AdminConsole"/>
</extension>
```

At step 96, the host obtains the named instance of the extension registry, such as the filter aware extension registry instance 52 of FIG. 3, in order to activate any associated filters, such as the filter extension module 56 of FIG. 3. Example program code for step 96 is as follows:

```
InitialContext ic = new InitialContext( );
String lookupName = "services/extensionregistry/AdminConsole";
IExtensionRegistry reg = (IExtensionRegistry)ic.lookup( lookupName );
```

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative graphical user interface constructs, one skilled in the art will recognize that they may be embodied using a variety of other alternative graphical user interfaces.

We claim:
1. A method of extending the functionality of a computer software application program at run time, comprising:
   determining, by an application extension point within said application program, that a filter aware extension registry should be used when finding extension modules attached to said application extension point;
   obtaining, by said application extension point, said filter aware extension registry;
   calling, by said filter aware extension registry, a filter extension, wherein said filter extension is one of a plurality of filter extensions attached to a filter extension point of said filter aware extension registry;
   determining, by said filter extension in response to said calling by said filter aware extension registry, a set of extension modules attached to said application extension point responsive to at least one current context attribute, wherein said set of extension modules attached to said application extension point is a subset of all extension modules attached to said application extension point; and
   passing said set of extension modules attached to said application extension point from said filter extension to said application extension point.
2. The method of claim 1, further comprising:
   wherein said filter aware extension registry comprises a named instance of a global extension registry; and
   wherein said filter aware extension registry is associated with said global extension registry by way of a registry instance extension point of said global extension registry.
3. The method of claim 2, further comprising implementing an interface for communicating with said filter extension point in said filter extension.
4. The method of claim 3, further comprising declaring a registry name corresponding to said named instance of said extension registry.
5. The method of claim 1, wherein said determining that said filter aware extension registry should be used when finding extension modules attached to said application extension point is responsive to at least one other current context attribute.
6. A system comprising: at least one processor and a non-transitory computer readable medium, said computer readable medium having program code stored thereon for extending the functionality of a computer software application program at run time, said program code comprising:
   program code for determining, by an application extension point within said application program, that a filter aware extension registry should be used when finding extension modules attached to said application extension point;
   program code for obtaining, by said application extension point, said filter aware extension registry;
   program code for calling, by said filter aware extension registry, a filter extension, wherein said filter extension is one of a plurality of filter extensions attached to a filter extension point of said filter aware extension registry;
   program code for determining, by said filter extension in response to said calling by said filter aware extension registry, a set of extension modules attached to said application extension point responsive to at least one current context attribute, wherein said set of extension modules attached to said application extension point is a subset of all extension modules attached to said application extension point; and program code for passing said set of extension modules attached to said application extension point from said filter extension to said application extension point.

7. The system of claim 6, further comprising:
wherein said filter aware extension registry comprises a named instance of a global extension registry, and
wherein said filter aware extension registry is associated with said global extension registry by way of a registry instance extension point of said global extension registry.

8. The system of claim 7, said program code further comprising program code for implementing an interface for communicating with said registry filter extension point in said filter extension.

9. The system of claim 7, further comprising program code for declaring a registry name corresponding to said named instance of said extension registry.

10. The system of claim 6, wherein said program code for determining that said filter aware extension registry should be used when finding extension modules attached to said application extension point is responsive to at least one other current context attribute.

11. A non-transitory computer readable medium comprising a computer program product, said computer readable medium having program code stored thereon for extending the functionality of a computer software application program at run time, said program code comprising:
program code for determining, by an application extension point within said application program, that a filter aware extension registry should be used when finding extension modules attached to said application extension point;
program code for obtaining, by said application extension point, said filter aware extension registry;
program code for calling, by said filter aware extension registry, a filter extension, wherein said filter extension is one of a plurality of filter extensions attached to a filter extension point of said filter aware extension registry;
program code for determining, by said filter extension in response to said calling by said filter aware extension registry, a set of extension modules attached to said application extension point responsive to at least one current context attribute, wherein said set of extension modules attached to said application extension point is a subset of all extension modules attached to said application extension point; and
program code for passing said set of extension modules attached to said application extension point from said filter extension to said application extension point.

12. A system for extending the functionality of a computer software application program at run time, comprising:
means for determining that a filter aware extension registry should be used when finding extension modules attached to an application extension point;
means for obtaining said filter aware extension registry;
means for calling a filter extension, wherein said filter extension is one of a plurality of filter extensions attached to a filter extension point of said filter aware extension registry;
means for determining a set of extension modules attached to said application extension point responsive to at least one current context attribute, wherein said set of extension modules attached to said application extension point is a subset of all extension modules attached to said application extension point; and
means for passing said set of extension modules attached to said application extension point from said filter extension to said application extension point.

* * * * *